US011900487B2

(12) United States Patent
Fang et al.

(10) Patent No.: US 11,900,487 B2
(45) Date of Patent: Feb. 13, 2024

(54) METHOD AND SYSTEM OF PROCESSING VEHICLE CHARGING INFORMATION

(71) Applicant: Neutron Holdings, Inc., San Francisco, CA (US)

(72) Inventors: Charlie Fang, San Francisco, CA (US); Aaron Nojima, San Francisco, CA (US); Zhao Zhang, San Francisco, CA (US); Fuxing Luan, Sunnyvale, CA (US); William Lee, S. San Francisco, CA (US); Meng Xie, E. Palo Alto, CA (US); Colin McMahon, San Francisco, CA (US); Nicholas S. Fong, San Jose, CA (US); Yuxin Zhai, Shenzhen (CN)

(73) Assignee: Neutron Holdings, Inc., San Francisco, CA (US)

( * ) Notice: Subject to any disclaimer, the term of this patent is extended or adjusted under 35 U.S.C. 154(b) by 248 days.

(21) Appl. No.: 17/155,573

(22) Filed: Jan. 22, 2021

(65) Prior Publication Data
US 2021/0158460 A1     May 27, 2021

Related U.S. Application Data

(63) Continuation of application No. PCT/CN2018/097575, filed on Jul. 27, 2018.

(51) Int. Cl.
*G06Q 30/02* (2023.01)
*G06Q 50/06* (2012.01)
(Continued)

(52) U.S. Cl.
CPC .............. *G06Q 50/06* (2013.01); *B60L 53/62* (2019.02); *B60L 53/65* (2019.02); *B60L 53/665* (2019.02);
(Continued)

(58) Field of Classification Search
CPC .... G06Q 30/02; G06Q 50/06; G06Q 30/0234; G06Q 30/0201; G06Q 30/0207;
(Continued)

(56) References Cited

U.S. PATENT DOCUMENTS 9,371,007 B1     6/2016  Penilla et al.
9,440,698 B2 *   9/2016  Dadoosh ................. B60L 53/14
(Continued)

FOREIGN PATENT DOCUMENTS

CN     106960369 A  *  7/2017  ............. G06Q 30/02
CN     107229982 A     10/2017
(Continued)

OTHER PUBLICATIONS

Massimilliano Petri;Marco Frosolini; Marino Lupi; Antonio Pratelli, ITS to charge behavior: A focus about bike mobility monitoring and incentive—The SaveMyBike system (English), 2016 IEEE 16th International Conference on Environment and Electrical Engineering (EEEIC) (pp. 1-6), Jun. 1, 2016 (Year: 2016).*

(Continued)

*Primary Examiner* — Marilyn G Macasiano
(74) *Attorney, Agent, or Firm* — Dentons US LLP

(57) ABSTRACT

A method of processing a charging information of a vehicle and system of processing a vehicle charging information comprises a user terminal transmitting a vehicle information to a cloud server; the cloud server obtaining a charging information of the vehicle; the cloud server transmitting a reward information corresponding to the vehicle identity information to the user terminal based on the state information of the vehicle, the information comprising the charging information; and the user terminal displaying the reward information.

15 Claims, 12 Drawing Sheets

(51) Int. Cl.
  *H04W 4/024* (2018.01)
  *H04W 4/44* (2018.01)
  *B60L 53/62* (2019.01)
  *B60L 58/12* (2019.01)
  *B60L 53/66* (2019.01)
  *B60L 53/65* (2019.01)
  *G06Q 30/0234* (2023.01)
  *G07C 5/00* (2006.01)
  *H04W 4/02* (2018.01)
  *H04L 67/10* (2022.01)
  *H04L 67/12* (2022.01)

(52) U.S. Cl.
  CPC .......... *B60L 58/12* (2019.02); *G06Q 30/0234* (2013.01); *G07C 5/008* (2013.01); *H04W 4/023* (2013.01); *H04W 4/024* (2018.02); *H04W 4/44* (2018.02); *H04L 67/10* (2013.01); *H04L 67/12* (2013.01)

(58) Field of Classification Search
  CPC .. G06Q 50/30; G06Q 30/0254; G06Q 10/067; G06Q 30/0246; B60L 53/62; B60L 53/65; B60L 53/665; B60L 58/12; G07C 5/008; H04W 4/023; H04W 4/024; H04W 4/44; H04L 67/10; H04L 67/12; Y02T 10/70; Y02T 10/7072; Y02T 90/12; Y02T 90/16
  See application file for complete search history.

(56) References Cited

U.S. PATENT DOCUMENTS

| | | | |
|---|---|---|---|
| 10,210,762 B1* | 2/2019 | Dotzler | G07C 5/0816 |
| 10,343,542 B2* | 7/2019 | Wild | B60L 53/65 |
| 11,403,907 B2* | 8/2022 | Noh | G07F 15/12 |
| 11,634,188 B2* | 4/2023 | North | B62H 3/08 |
| | | | 180/14.4 |
| 2013/0282472 A1 | 10/2013 | Penilla et al. | |
| 2018/0082585 A1* | 3/2018 | Zhang | G08G 1/096883 |
| 2020/0086939 A1* | 3/2020 | Iseman | B62K 3/002 |

FOREIGN PATENT DOCUMENTS

| | | | | |
|---|---|---|---|---|
| CN | 107657743 A | | 2/2018 | |
| KR | 2015-0066020 A | * | 6/2015 | B60L 11/18 |
| KR | 10-1692811 B1 | * | 1/2017 | B60L 11/18 |
| WO | WO 2018/044058 A2 | * | 3/2018 | H01R 13/66 |
| WO | WO 2019/019470 A1 | * | 1/2019 | B60L 11/18 |
| WO | WO 2021/251024 A1 | * | 12/2021 | G01C 21/26 |

OTHER PUBLICATIONS

Di Giorgio, A.; Liberati, F.; Canale, S, Optimal electric vehicles to grid power control for active demand services in distribution grids (English0, 2012 20th Mediterranean Conference on Control & Automation (MED) (pp. 1309-1315), Jul. 1, 2012 (Year: 2012).*

Gongjun Yan; Ding Wen; S. Olariu; M.C. Weigle, Security challenges in vehicular cloud computing (English), IEEE Transactions on Intelligent Transportation Systems (vol. 14, Iddue: 1,pp. 284-294), Dec. 16, 2013 (Year: 2013).*

Juho Lee; Sungkwon Park, User-oriented vehicle charging profile service in cloud environment (English), 2014 4th IEEE International Conference on Network Infrustructure and Digital Content (pp. 364-367), Jan. 23, 2015 (Year: 2015).*

International Search report dated Nov. 25, 2020 for PCT Application No. PCT/CN2018/097575, 3 pages.

* cited by examiner

METHOD AND SYSTEM OF PROCESSING VEHICLE CHARGING INFORMATION

CROSS REFERENCE TO RELATED APPLICATIONS

This application is a continuation of PCT application no. PCT/CN2018/097575, filed Jul. 27, 2018, which application is incorporated herein in its entirety by this reference thereto.

TECHNICAL FIELD

The present disclosure relates to vehicles and, in particular, to a method and system of processing vehicle charging information.

BACKGROUND

Rental vehicles are designed to provide the last mile transportation. A rental vehicle can be powered by a rechargeable battery which is charged through a charger. Operation maintenance personnel can charge the rental vehicles on a scheduled or unscheduled manner due to a high frequency of use.

SUMMARY

There is a need to provide an improved method of charging the rental vehicles. The present disclosure provides a method and system of processing vehicle charging information. Users are incentivized to charge the rental vehicles, such that a workload of the operation maintenance personnel is reduced.

Aspects of the disclosure provide a method of processing charging information of a vehicle. The method can comprise receiving, at the cloud server, vehicle identity information from a user terminal; obtaining, at the cloud server, state information of the vehicle; and transmitting, by the cloud server, reward information corresponding to the vehicle identity information to the user terminal based on the state information of the vehicle. The state information comprises charging information.

Another aspect of the disclosure provides a method of processing charging information of vehicle, the method being performed at the vehicle. The method can comprise the vehicle transmitting charging information of the vehicle to a cloud server, or the vehicle providing charging information of the vehicle in response to a request from the cloud server.

Another aspect of the disclosure provides a method of processing a charging information of vehicle, the method being performed at the vehicle. The method can comprise transmitting identity information of the vehicle to a cloud server, receiving reward information from the cloud server, and displaying the reward information.

Another aspect of the disclosure provides a system of processing charging information of a vehicle. The system can comprise at least one user terminal, at least one vehicle, and at least one cloud server. The user terminal can be configured to transmit vehicle information to a cloud server. The cloud server can be configured to receive the vehicle information from the user terminal, obtain charging information of the vehicle, and transmit reward information corresponding to the vehicle information to the user terminal based on a state information of the vehicle. The state information can comprise the charging information. The vehicle can be configured to transmit the charging information to the cloud server or provide the charging information of the vehicle in response to a request from the cloud server.

Another aspect of the disclosure provides a cloud server. The cloud server can comprise at least one processor; and a memory configured to store at least one program, when executed by the at least one processor, causing the at least one processor to receive vehicle information transmitted by the user terminal, obtain a charging information of the vehicle, and transmit reward information to the user terminal based on a state information of the vehicle. The state information can comprise at least the charging information.

Another aspect of the disclosure provides an apparatus for processing charging information of a vehicle. The apparatus can be used at a user terminal. The apparatus can comprise a first sending module configured to transmit vehicle identity information to a cloud server; a first receiving module configured to receive reward information from the cloud server; and a first display module configured to display the reward information.

Another aspect of the disclosure provides a vehicle having a rechargeable battery. The vehicle can comprise a detecting module coupled to the rechargeable battery and configured to detect charging information of the battery, a communication module configured to transmit charging information to a cloud server or to provide the charging information of the vehicle in response to a request from the cloud server, and a central controller being coupled to the detecting module and the communication module.

DETAILED DESCRIPTION

Figure 1:
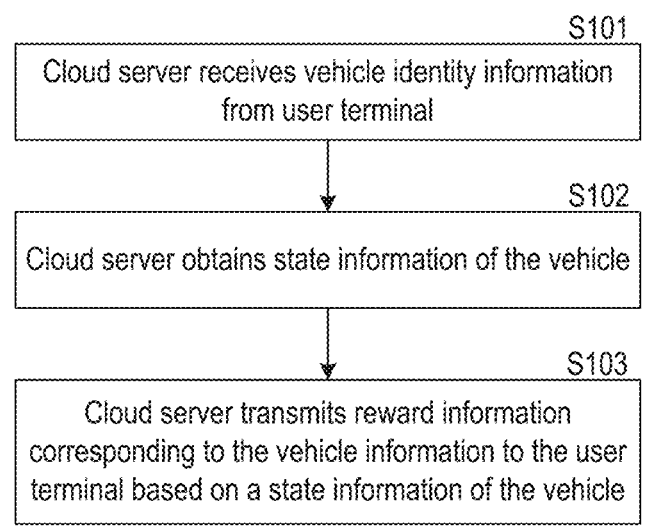
FIG. 1 illustrates a flow chart of a method of processing vehicle charging information in accordance with some embodiments of the disclosure.

FIG. 1 illustrates a flow chart of a method of processing vehicle charging information in accordance with some embodiments of the disclosure. The method can comprise processes S101 to S104.

In process S101, a cloud server receives vehicle identity information from a user terminal.

In some embodiments, the time at which the cloud server receives the vehicle identity information from the user terminal is the time when the vehicle is unlocked. The user can login to a client-end App at the user terminal, and vehicles that need to be charged around the user can be displayed at the client-end App. The vehicle can be provided with a two-dimensional code, and the user terminal can be provided with a scanning module. The user can scan the two-dimensional code of the vehicle using the code scanning module and transmit a vehicle information to the cloud server. In alternative embodiments, the user can input the vehicle identity information through the client-end App on the user terminal, such that the cloud server receives the vehicle identity information from the user terminal. In some instances, the vehicle identity information can be a coded information such that the vehicle has a unique identifier in the system. The coded information can include physical information of the vehicle or predetermined identification information.

In process S102, the cloud server obtains state information of the vehicle.

In some embodiments, the time at which the cloud server obtains the state information of the vehicle can be the time at which a charging of the vehicle is completed. The cloud server can obtain the state information of the vehicle passively or actively. For instance, with a passive manner, the vehicle can transmit a charging information to the cloud server when the user completes charging of the vehicle. Alternatively, the vehicle can transmit vehicle locking information to the cloud server when the user completes charging of the vehicle and locks the vehicle. The vehicle locking information can include the charging information of the vehicle. The cloud server can obtain the charging information of the vehicle from the vehicle locking information. For instance, with an active mode, the cloud server can actively acquire the charging information of the vehicle through a network when the user completes charging of the vehicle. The charging information can include at least one of voltage information, power amount information, and current information of the battery of the vehicle when the charging is completed.

In process S103, the cloud server can transmit reward information corresponding to the vehicle information to the user terminal based on the state information of the vehicle, the state information including the charging information of the vehicle.

In some embodiments, the cloud server can calculate the reward information based on the state information of the vehicle when the vehicle is locked. The state information can include the charging information. For instance, a determination can be made on whether a power amount of the rechargeable battery of the vehicle is charged by the user to 95% or more. If a determination is made that a power amount of the rechargeable battery of the vehicle is charged by the user to 95% or more, then the cloud server can transmit a reward corresponding to the charging information to a bank account of the user based on the charging information and transmit the reward information to the user terminal. For instance, the cloud server can determine, based on the received charging information of the vehicle, whether the charging information of the vehicle satisfies a first reward criterion, where the first reward criterion can be the battery power level of the vehicle reaching or exceeding a predetermined power amount. For instance, the first reward criterion can be the battery power level of the vehicle reaching or exceeding 95% of the total power amount. The reward information can be sent to the user terminal when the charging information of the vehicle satisfies the first reward criterion.

Figure 2:
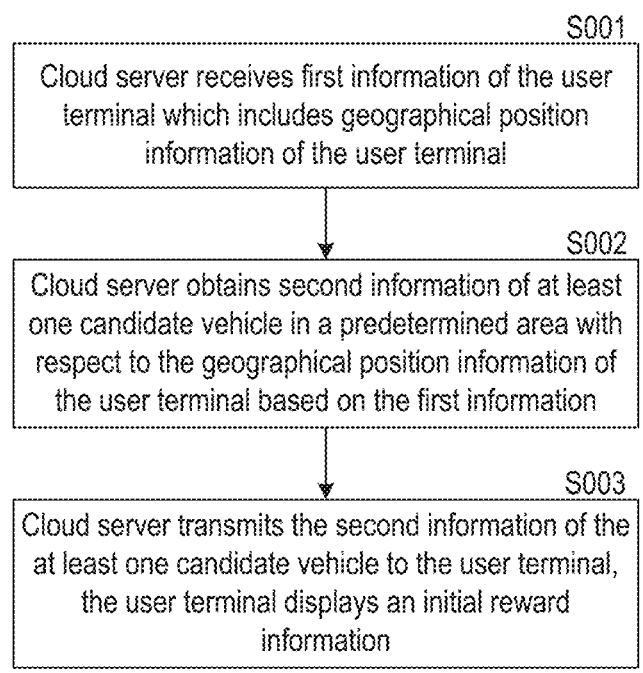
FIG. 2 illustrates a flow chart of a method of processing vehicle charging information in accordance with some embodiments of the disclosure.

In some embodiments, prior to the process S101, processes S001-S003 as illustrated in FIG. 2 can be performed. FIG. 2 illustrates a flow chart of a method of processing a vehicle charging information prior to the method of FIG. 1. The method illustrated in FIG. 2 can be performed at the cloud server.

In process S001, the cloud server can receive a first information of the user terminal, where the first information includes geographical position information of the user terminal. For instance, when the user opens the client-end App on the user terminal, the client-end App can automatically obtain the geographical position information of the user terminal and transmit the geographical position information to the cloud server.

In process S002, the cloud server can obtain a second information of at least one candidate vehicle in a predetermined area with respect to the geographical position information of the user terminal based on the first information. The at least one candidate vehicle can be a vehicle having a battery satisfying a threshold state. The second information can include a current geographical position information of the at least one candidate vehicle.

In some embodiments, the candidate vehicle, e.g. surrounding vehicle, can be a vehicle within a certain distance range, e.g. the predetermined area, from the geographical position of the user terminal. For instance, the predetermined area can be an area centering at the geographical position of the user terminal and radiating a distance of 0-500 meters, and the candidate vehicle can be a vehicle satisfying a threshold state within the predetermined area. The candidate vehicle can be a vehicle having a battery satisfying a threshold power amount condition. The threshold power amount condition can include at least one of the battery having a power amount less than a threshold power amount. e.g. the threshold power amount can be 50% or 90% of the total amount, or the battery having a voltage less than a threshold voltage, e.g. the threshold voltage can be set based on a condition of the vehicle battery.

In some embodiments, the threshold power amount can be correlated with a time period of the day. For instance, the vehicle can be used frequently during the daytime, thus the threshold power amount can be set to 50% of the total amount during the daytime. The vehicle can be used at a lower frequency at night. Thus, the threshold power amount can be set to 90% of the total power amount at night.

In an alternative embodiment, the first information received by the cloud server from the user terminal can include a request information of at least one candidate vehicle within the predetermined area with respect to the geographical position information of the user terminal. The cloud server can obtain the second information of the at least one candidate vehicle within the predetermined area based on a current geographical position information of the at least one candidate vehicle and the request information. The at least one candidate vehicle can be a vehicle having a battery satisfying a threshold state. The second information can include current geographical position information of the at least one candidate vehicle The cloud server can obtain the current geographical position information of the at least one candidate vehicle by searching the vehicle information in the vicinity of the geographical position of the user terminal based on the first information. For instance, the cloud server can be provided with a database where geographical position information of each vehicle and state information of each vehicle batteries can be received and stored. In some instances, the vehicle can periodically transmit the geographical position information and the battery state information to the cloud server, such that the cloud server can automatically acquire a current position information of a candidate vehicle based on the first information.

In process S003, the cloud server can transmit the second information of the at least one candidate vehicle to the user terminal, such that the user terminal displays an initial reward information corresponding to the at least one candidate vehicle. The initial reward information can indicate the reward that a user associated with the user terminal can receive if the user charges the candidate vehicle. The reward can be provided as cash or gift. In some instances, if the reward is provided as cash, the reward can be set as a fixed reward. In other words, the user can receive the fixed reward as long as the candidate vehicle is charged from the current battery level to a fully charged level or substantially fully charged level, regardless of the currently remaining power level the candidate vehicle. The reward can be set as a variable reward. For instance, the reward can be dynamically adjusted according to time and weather conditions.

In an embodiment, the initial reward information is that when the charging information of the vehicle satisfies the first reward criterion, the returning position information of the vehicle satisfies the second reward criterion, and the returning time information of the vehicle satisfies the third reward criterion, and the user deserves the full Information on the amount of rewards.

Upon receiving the second information transmitted from the cloud server, the user terminal can process or convert the second information. For instance, the geographical position information of the surrounding vehicle can be embedded into a map display module of the client-end App. A visual object indicating the reward information to be received by the user associated with the user terminal if the user charges the surrounding vehicle, e.g. a value of $5 or $10, can be displayed on the client-end App. Alternatively, the reward information can be a text information or a visual object such as "award" or "gift" indicating that the user associated with the user terminal can receive a reward if the user charges the surrounding vehicle. The user associated with the user terminal can be the owner of the user terminal.

Figure 3:
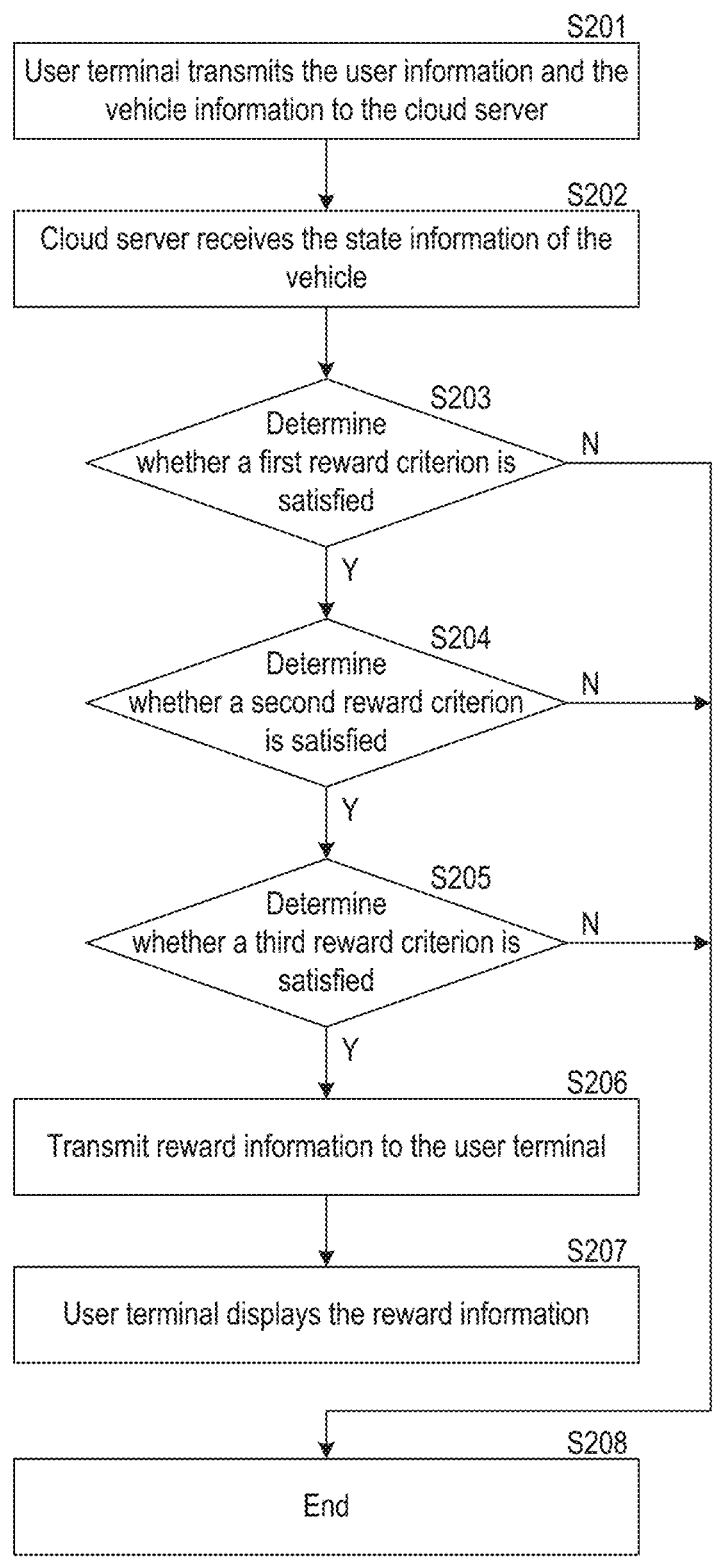
FIG. 3 illustrates a flow chart of a method of processing vehicle charging information in accordance with an alternative embodiment of the disclosure.

FIG. 3 illustrates a flow chart of a method of processing a vehicle charging information in accordance with an alternative embodiment of the disclosure. The method can include processes S201 to S207.

In process S201, the user terminal can transmit the user information and the vehicle information to the cloud server.

In some instances, the user information can be a telephone number of the user terminal, and the telephone number can be bound to a bank account of the user. For instance, when the user registers with the user program on the user terminal, the user can input and bind personal information including a telephone number or a bank account. The cloud server can store the user information uploaded from the user terminal. When unlocking a vehicle, the user terminal can transmit the vehicle identity information and the user information to the cloud server. The server can send an unlocking command to the vehicle once the cloud server authenticates the user terminal, and thus the vehicle can be unlocked. The user can move the vehicle to a place, e.g., an indoor place, where a charging of the vehicle can be performed and charge the vehicle.

In some instances, the user information and the vehicle identity information can be sent separately by the user terminal to the cloud server. For instance, when the user logins to the client-end App, the user information can be sent to the cloud server. The user terminal can transmit the vehicle identity information to the cloud server later when the user scans the two-dimensional code of the vehicle.

In process S202, the cloud server can receive the state information of the vehicle. The state information can include the charging information, returning position information of the vehicle, and returning time information of the vehicle.

In process S203, the cloud server can determine, based on the charging information, whether a first reward criterion is satisfied. The first reward criterion can be the battery power amount of the vehicle reaching or exceeding a predetermined power amount. If it is determined that the charging information satisfies the first reward criterion, the process S204 can be performed; otherwise, a process S208 can be performed.

In process S204, the cloud server can determine, based on the returning position information of the vehicle, whether a second reward criterion is satisfied. The second reward criterion can be the returning position information of the vehicle being within a predetermined geographical range. If it is determined that the returning position information of the vehicle satisfies the second reward criterion, a process S205 can be performed; otherwise, a process S208 can be performed.

In some embodiments, the returning position information can be the geographical position information of the vehicle when the user returns the vehicle. For instance, when the user returns the vehicle, the user can scan the two-dimensional code of the vehicle using the user terminal, and meanwhile, the vehicle can be locked. The current geographical position information of the vehicle can be transmitted to the server when the vehicle is locked. The predetermined geographical position can be a prescribed geographical position or a position in proximity to the prescribed geographical position. For instance, the predetermined geographical position can be a vehicle hub.

In process S205, the cloud server can determine, based on the returning time information of the vehicle, whether a third reward criterion is satisfied. The third reward criterion can be the returning time information of the vehicle being within a predetermined time period. If it is determined that the returning time information of the vehicle satisfies the third reward criterion, a process S206 can be performed; otherwise, a process S208 can be performed.

In some embodiments, the returning time information of the vehicle can be the current time when the user returns the vehicle. The predetermined time period can be a prescribed time period. The predetermined time period can include at least one time period. The predetermined time period can be a time period before the morning rush hours to increase a usage rate of the vehicle. For instance, the predetermined time period can be before 7:00 AM or before 12:00 PM. For instance, the predetermined time period can include two time periods, for example, before 7:00 AM and before 12:00 PM. In process S206, the reward information can be transmitted to the user terminal.

In process S207, the user terminal can display the reward information.

The reward information can be visually displayed on the client-end App once the reward information is received from the cloud server. Alternatively, the reward information can be provided in an audio manner. The reward information can include a cash reward, a riding credit, a number of free rides, or a time period of free ride. In some embodiments, the cloud server can transmit the reward information to the user terminal and simultaneously issue the reward. For instance, the cloud server can issue the reward into the personal account associated with the user, such that the user can withdraw or purchase a monthly riding card or an annual riding card. For instance, when a bank account is bound, the cloud server can issue the reward into the bank account associated with the user terminal.

The method can end at process S208.

In some embodiments, when the charging information satisfies the all the three reward criterions, e.g. the first reward criterion, the second reward criterion, and the third reward criterion, the cloud server can issue the user a full reward and can transmit an information indicating "reward" the user terminal. When the charging information does not satisfy one of the three reward criteria, the cloud server may not issue the user a reward, and an information indicating "no reward" can be transmitted to the user terminal.

Figure 4:
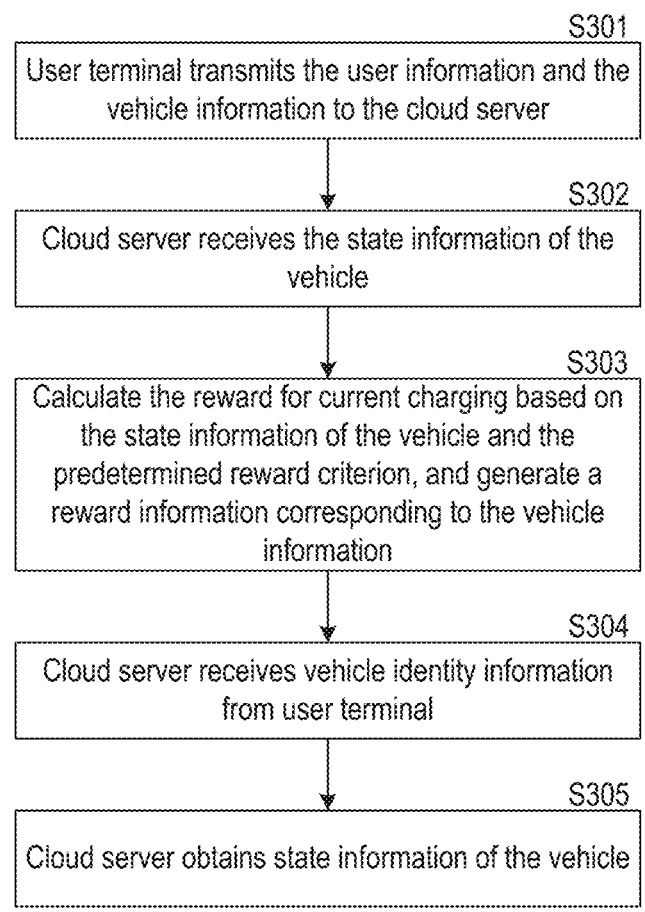
FIG. 4 illustrates a flow chart of a method of processing vehicle charging information in accordance with a yet alternative embodiment of the disclosure.

FIG. 4 illustrates a flow chart of a method of processing a vehicle charging information in accordance with a yet alternative embodiment of the disclosure. The method can comprise processes S301 to S305.

In process S301, the user terminal can transmit the user information and the vehicle information to the cloud server.

In process S302, the cloud server can receive the state information of the vehicle.

In process S303, the cloud server can calculate the reward for the current charging based on the state information of the vehicle and the predetermined reward criteria and generate a reward information corresponding to the vehicle information. The reward information can indicate the reward.

In some embodiments, the state information can include the charging information, the returning position information and the returning time information of the vehicle. The predetermined reward criteria can be a combination of the charging information, the returning position information, and the returning time information of the vehicle. The server can calculate the reward for current charging based on a weight of each of state information. Table 1 illustrates an exemplary reward criterion.

TABLE 1

| No. | State information of vehicle | | | Total weight |
|---|---|---|---|---|
| 1 | Vehicle battery power amount being charged exceeding 95% | ≥95% 80%-95% ≤80% | 50% 40% 0 | 50% |
| 2 | Vehicle being returned to a compliance position | YES NO | 30% 0 | 30% |
| 3 | Vehicle being returning at a time falling within a prescribed time period | YES NO | 20% 0 | 20% |

The compliance position can be the predetermined geographical position.

In an alternative embodiment, the state information can include the charging information. The charging information can include at least one of a voltage information, a power amount information, and a current information of the battery to which is charging is completed. For each vehicle being charged, the battery can have different power amount. The cloud server can issue the same or different rewards based on the predetermined reward criterion.

In some embodiments, the reward information can be used to indicate the reward. The predetermined reward criterion can be a predetermined correspondence between the charging information of the vehicle and the reward. The predetermined reward criterion can be designed such that the various charged power amounts corresponds to various rewards, and the cloud server can issue a corresponding reward based on the charged power amount. For instance, a full reward can be issued if the vehicle's charged power amount reaches 95% of total battery amount or more and the vehicle is returned to the prescribed geographical position within the prescribed time period, and the reward information of the reward corresponding to the full reward can be generated. A deducted reward of 80% of the full reward can be issued if the vehicle's charged power amount reaches 95% of total battery amount or more, and the vehicle is returned the prescribed geographical position, but the vehicle is not returned in the prescribed time period, and the reward information corresponding to the reward of 80% of the full reward can be generated. A deducted reward of 50% of the full reward can be issued if the vehicle is charged while the vehicle is not returned to the prescribed geographical position and the vehicle is not returned in the prescribed time period but is sent to other positions within other time periods, only 50% of the full reward vehicles can be issued.

In process S304, the cloud server can transmit the reward information to the user terminal.

In process S305, the user terminal can display the reward information.

Figure 5:
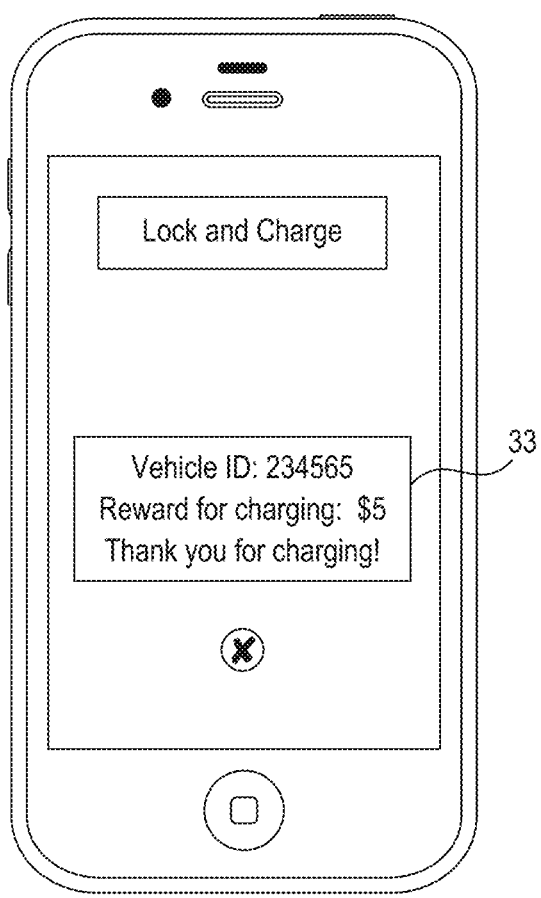
FIG. 5 illustrates a user interface of a user terminal in accordance with some embodiments of the disclosure.

FIG. 5 illustrates a user interface of a user terminal in accordance with some embodiments of the disclosure. The user terminal can display the reward for the current charging by displaying the reward information 33 on the interface. The reward information 33 can show a reward for the current charging, such as "$5."

Figure 6:
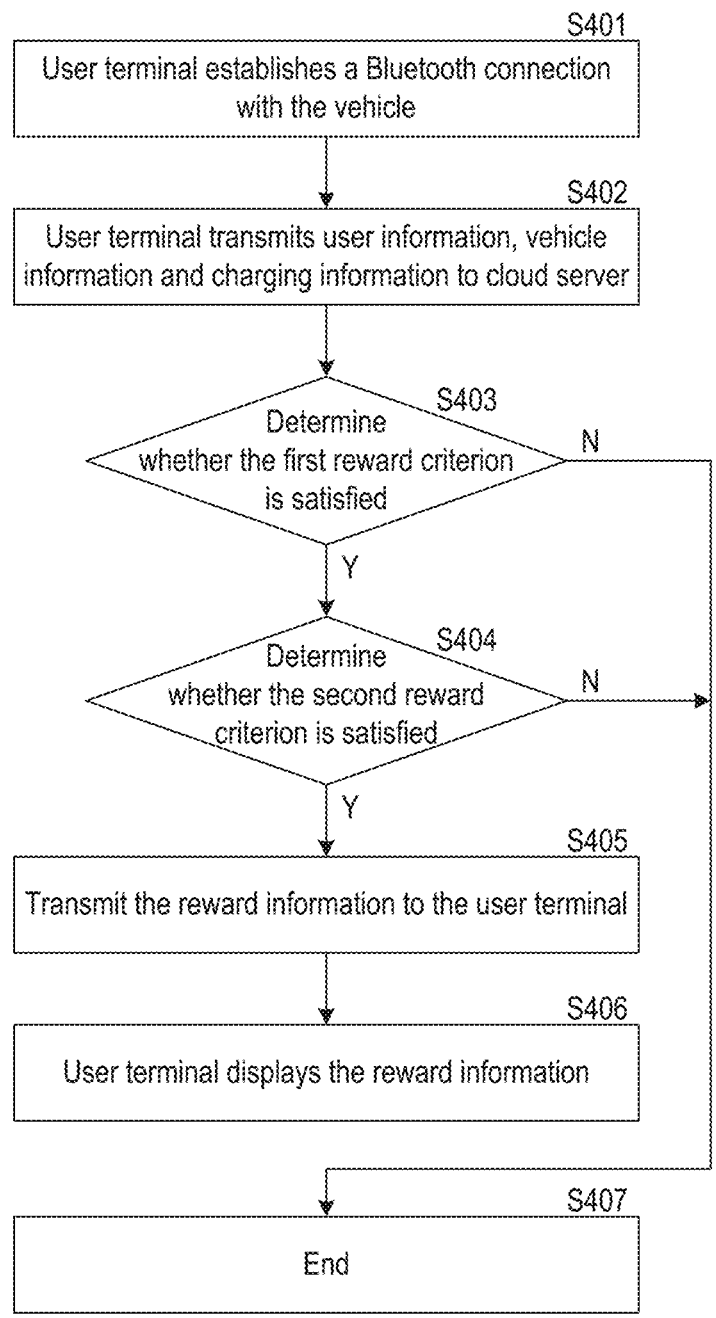
FIG. 6 illustrates a flow chart of a method of processing vehicle charging information in accordance with a still alternative embodiment of the disclosure.

FIG. 6 illustrates a flow chart of a method of processing vehicle charging information in accordance with a still alternative embodiment of the disclosure. The method can comprise processes S401 to S407.

In process S401, the user terminal can establish a Bluetooth connection with the vehicle.

In some embodiments, the user can scan the two-dimensional code of the vehicle using the client-end App on the user terminal. The user may be prompted whether to establish a Bluetooth connection with the vehicle. If the user accepts the Bluetooth connection, the vehicle can transmit the charging information of the vehicle to the user terminal via the Bluetooth connection, and processes S402 to S407 can then be performed.

In process S402, the user terminal can transmit the user information, the vehicle information, and the charging information of the vehicle to the cloud server.

In some embodiments, the user terminal can transmit the charging information of the vehicle to the cloud server once a charging of the vehicle is completed. The user terminal can establish a Bluetooth connection with the vehicle. Therefore, when the charging is completed, the vehicle can transmit the charging information to the user terminal, and the user terminal can transmit the charging information to the cloud server.

In process S403, the cloud server can determine, based on the charging information, whether the first reward criterion is satisfied. The first reward criterion can be the battery power amount of the vehicle reaching or exceeding a predetermined power amount. If it is determined that the charging information satisfies the first reward criterion, a process S404 can be performed; otherwise, a process S407 can be performed.

In process S404, the cloud server can determine, based on the returning position information of the vehicle, whether the second reward criterion is satisfied. The second reward criterion can be the return geographical position of the vehicle being a predetermined geographical position. If it is determined that the returning position information of the vehicle satisfies the second reward criterion, a process S405 can be performed; otherwise, a process S407 can be performed.

In process S405, the reward information can be transmitted to the user terminal.

In process S406, the user terminal can display the reward information.

The method can end at process S407.

Figure 7:
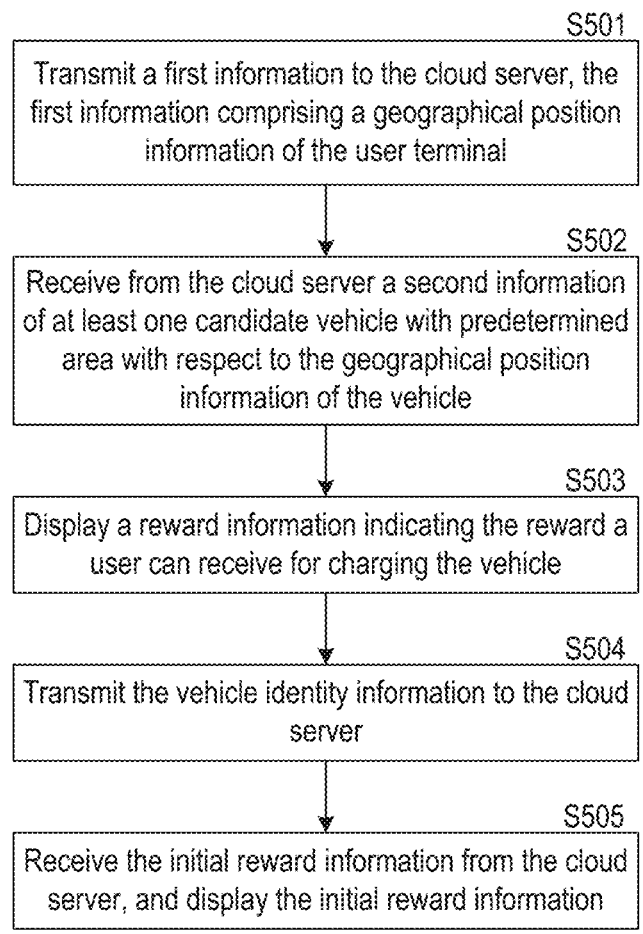
FIG. 7 illustrates a flow chart of a method of processing vehicle charging information in accordance with some embodiments of the disclosure.

FIG. 7 illustrates a flow chart of a method of processing vehicle charging information used with user terminal in accordance with some embodiments of the disclosure. The method can comprise processes S501 to S505.

In process S501, first information can be sent to the cloud server. The first information can comprise a geographical position information of the user terminal.

When the user opens the client-end App on the user terminal, the client-end App can automatically obtain the geographical position information of the user terminal and transmit the geographical position information to the cloud server. The client-end App can comprise a map display module through which the user can view a current geographical position and surrounding vehicles. For instance, when the user opens the client-end App on the user terminal, the user can click a button on the client-end App to trigger the process of transmitting the first information to the cloud server.

In some instances, when the first information is transmitted to the cloud server, a request for acquiring surrounding vehicle information can be transmitted. The surrounding vehicle can be a vehicle within a certain distance from the geographical position of the user terminal. For instance, the surrounding vehicle can be a vehicle within an area centering at the geographical position of the user terminal and radiating a distance of 0-500 meters. For instance, the surrounding vehicle can be a vehicle having a battery satisfying a threshold state condition. The first state information can comprise a power amount information and a voltage information of the battery. The threshold state condition can be the battery having a power amount less than a threshold power amount. The threshold power amount can be 90% or less of the total power amount of the battery. The threshold state condition can be the battery having a voltage less than a threshold voltage. The threshold voltage can be set based on the condition of the vehicle battery.

In process S502, second information of at least one candidate vehicle can be received from the cloud server. The candidate vehicle, e.g. surrounding vehicle, can be within a predetermined area with respect to the geographical position information of the vehicle.

In some instances, the surrounding vehicle can be a vehicle which is positioned within a certain distance from the geographical position of the user terminal and has a battery satisfying the threshold power amount condition. In other words, in this process, a second information of at least one candidate vehicle can be received from the cloud server, where the candidate vehicle is positioned within the predetermined area with respect to the geographical position information of the vehicle. The at least one candidate vehicle can be a vehicle having a battery satisfying the threshold power amount condition. The second information can include current position information of the at least one candidate vehicle.

In process S503, a reward information, which is the information indicating the reward a user associated with the user terminal can receive for charging the vehicle, can be displayed. In other words, the initial reward information corresponding to the at least one candidate vehicle can be displayed. The initial reward information can comprise a cash or a bonus gift that the user associated with the user terminal can receive if the user replenishes the candidate vehicle.

The processes S501-S503 can be performed when the user wants to view a vehicle which is associated with a reward in proximity to the user. Optionally, the processes S501-S503 can be performed when the user is looking for a vehicle which is associated with a reward in proximity to the user.

In process S504, the vehicle identity information can be transmitted to the cloud server. For instance, the identity information of the vehicle which is selected by the user for charging from the at least one candidate vehicle can be obtained, and the vehicle identity information can be transmitted to the cloud server. This process can be performed when the user is ready to charge the vehicle. The process can be performed to inform the cloud server which vehicle the user wants to charge.

In process S505, the initial reward information can be received from the cloud server, and the initial reward information can be displayed.

In some instances, once receiving the second information transmitted from the cloud server, the user terminal can process or convert the second information. For instance, the geographical position information of the surrounding vehicle can be embedded into a map display module of the client-end App. A visual object indicating the reward information to be received by the user associated with the user terminal if the user charges the surrounding vehicle, e.g. a value of $5 or $10, can be displayed on the client-end App. Alternatively, the reward information can be a text information or a visual object such as "award" or "gift" indicating that the user associated with the user terminal can receive a reward if the user charges the surrounding vehicle. The user associated with the user terminal can be the owner of the user terminal. The process S505 can be performed when the user charges the vehicle, and the cloud server confirms the charging.

Figure 8:
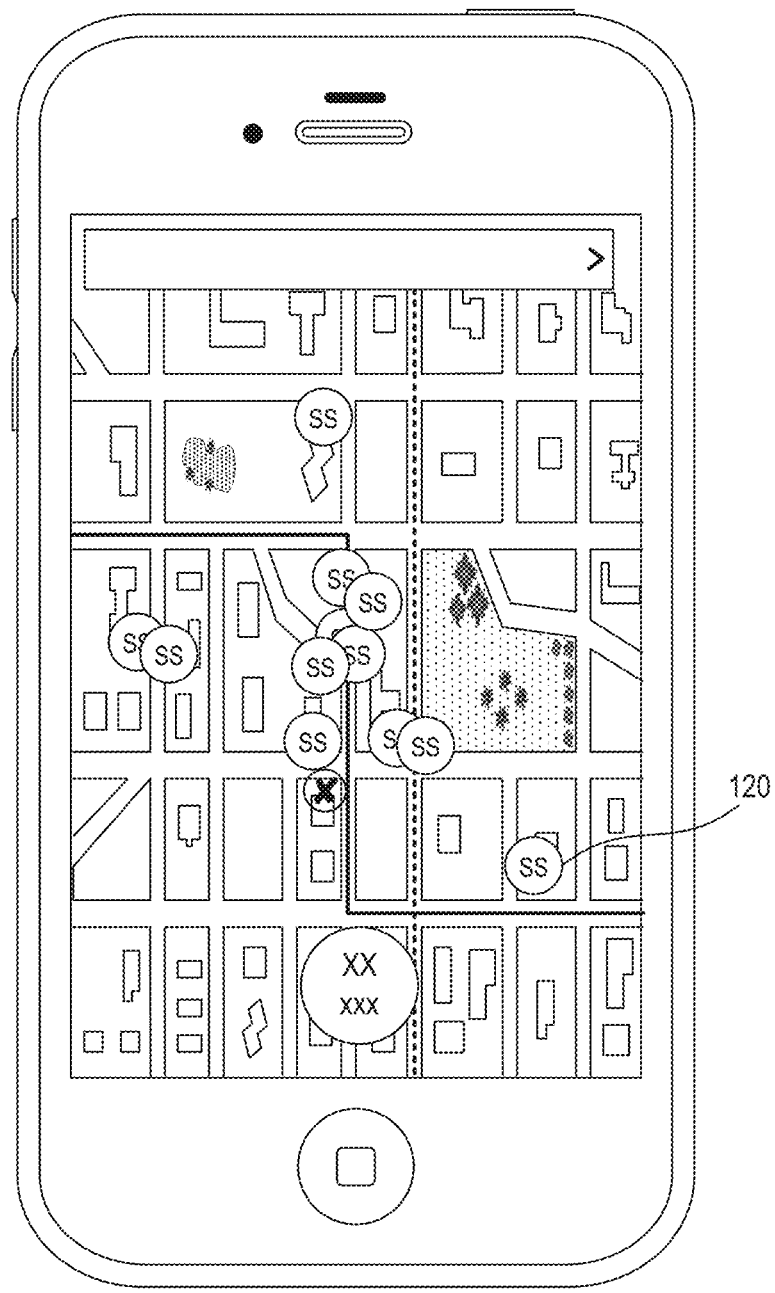
FIG. 8 illustrates a user interface of a user-end App on a user terminal in accordance with some embodiments of the disclosure.

FIG. 8 illustrates a user interface of a user-end App on a user terminal in accordance with some embodiments of the disclosure. When the user opens the client-end App, the client-end App can be configured to display the surrounding vehicles 120 around the user that needs to be charged based on the positioning of the user terminal. The surrounding vehicles can be displayed on the client-end App in the form of an icon showing a numerical reward of "$5" on the interface of the client-end App. The showing of "$5" can mean that the user receives a $5 reward if the charging information of the vehicle satisfies the first reward criterion, the returning position information of the vehicle satisfies the second reward criterion, and the returning time information of the vehicle satisfies the third reward criterion. When the user finds at least one vehicle 120 that needs to be charged, the user can click the "unlock now" or "collect vehicle" button on the interface of the client-end App to unlock the vehicle for charging operations.

Figure 9:
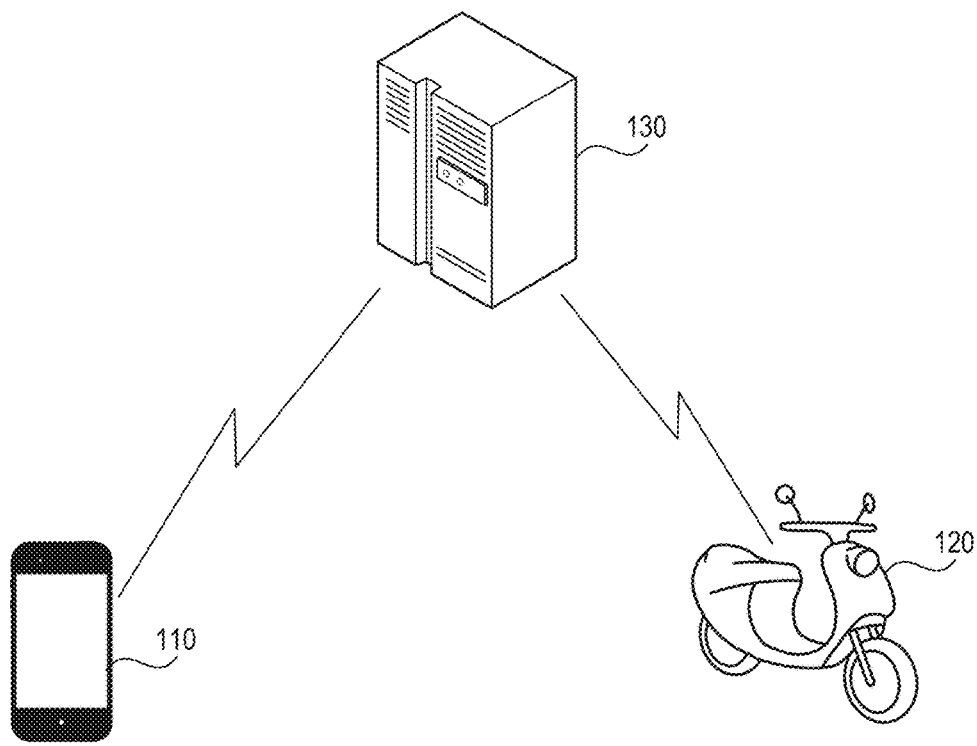
FIG. 9 is a schematic diagram of a system of processing vehicle charging information in accordance with some embodiments of the disclosure.

FIG. 9 is a schematic diagram showing a configuration of a system of processing a vehicle charging information in accordance with some embodiments of the disclosure. In some embodiments, the system of processing vehicle charging information can comprise at least one user terminal, at least one vehicle, and at least one cloud server. For instance, one user terminal 110, one vehicle 120, and one cloud server 130 are shown in FIG. 9.

The user terminal 110 can be a mobile computing device which can be held by the user, such as a mobile phone, a computer or a tablet IPAD, a headset with virtual reality (VR) or Augmented Reality (AR) function, or a wearable smart device, e.g. smart watches, smart glasses, and smart clothing. Each of the user terminals can be provided with functions such as communication, positioning, and network connection. A client-end App can be installed to the user terminal. The user can view the surrounding vehicle distribution information using the client-end App on the user terminal, request to unlock a surrounding vehicle, and check the reward information.

The vehicle 120 can be provided with a rechargeable battery, a motor, and a control device. The control device can be a device that is externally attached to the vehicle body or a device built in the vehicle body. The control device can include a motor control portion and a central control portion. The motor control portion and the central control portion can be separate control circuits or an integrated control circuit. The motor control portion can include a motor controller and a motor. The motor controller can be configured to control an output power of the motor. The control device can further include a lock mechanism configured to unlock and lock the vehicle.

Figure 10:
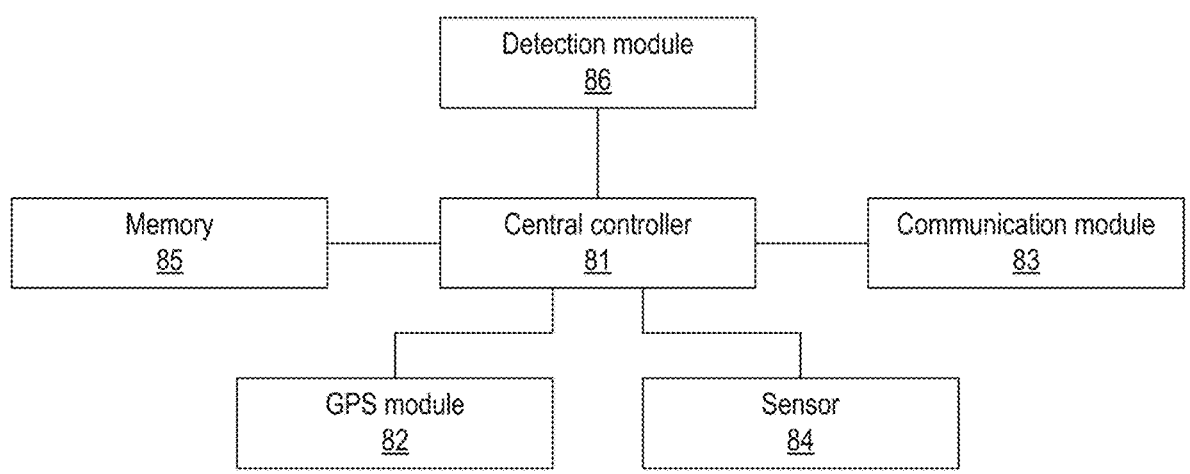
FIG. 10 is a schematic diagram of a central control unit in accordance with some embodiments of the disclosure.

FIG. 10 is a schematic diagram of a central control unit in accordance with some embodiments of the disclosure. As shown in FIG. 10, the central control portion can comprise a central controller 81, a Global Positioning System (GPS) module 82, a communication module 83, a sensor 84 (such as a gyroscope), a memory 85, and a detection module 86.

The central controller 81 of the vehicle can be operably connected to the detection module 86 and the communication module 83. The communication module 83 can be configured to transmit state information, e.g. information indicating an unlocking and a locking of a lock of the lock mechanism of the vehicle, the charging information of the rechargeable battery, the geographical position information of the vehicle, and an abnormal vibration information of the vehicle to the cloud server. The central controller can further be configured to receive information from the cloud server, such as an unlocking/locking command, a configuration information for respective portion of the central controller, and upgrade information. The detecting module 86 can be configured to detect a battery information of the rechargeable battery, such as a battery voltage, a current or power amount information. The detecting module 86 can comprise a chip configured to convert an analog signal into a digital signal.

In some embodiments, the vehicle 120 can be an electric scooter comprising a horizontal handle, a vertical pipe, a head pipe, a front fork, a front wheel, a rear wheel, a rear fork, a pedal, and a tail. The motor can be provided at the front wheel, the rear wheel, or the pedal. The battery can be provided in the vertical pipe or at an exterior of the vertical pipe. The control device can be provided inside the scooter body or externally attached to the exterior of the scooter. The scooter can further comprise a charger. The charger can be integral with the scooter, such as inside the scooter body. The charger can be externally attached to the exterior of the scooter, such that the scooter can be charged with an external power source. The charger can be provided independent of the scooter. Alternatively, the vehicle can be an electric bicycle for rental, a balance vehicle, or any rental electric vehicle that requires a battery power.

The cloud server 130 can be a management terminal. The cloud server can be configured to support a rental of the vehicle, such as information receiving/transmitting, and reward calculation.

Figure 11:
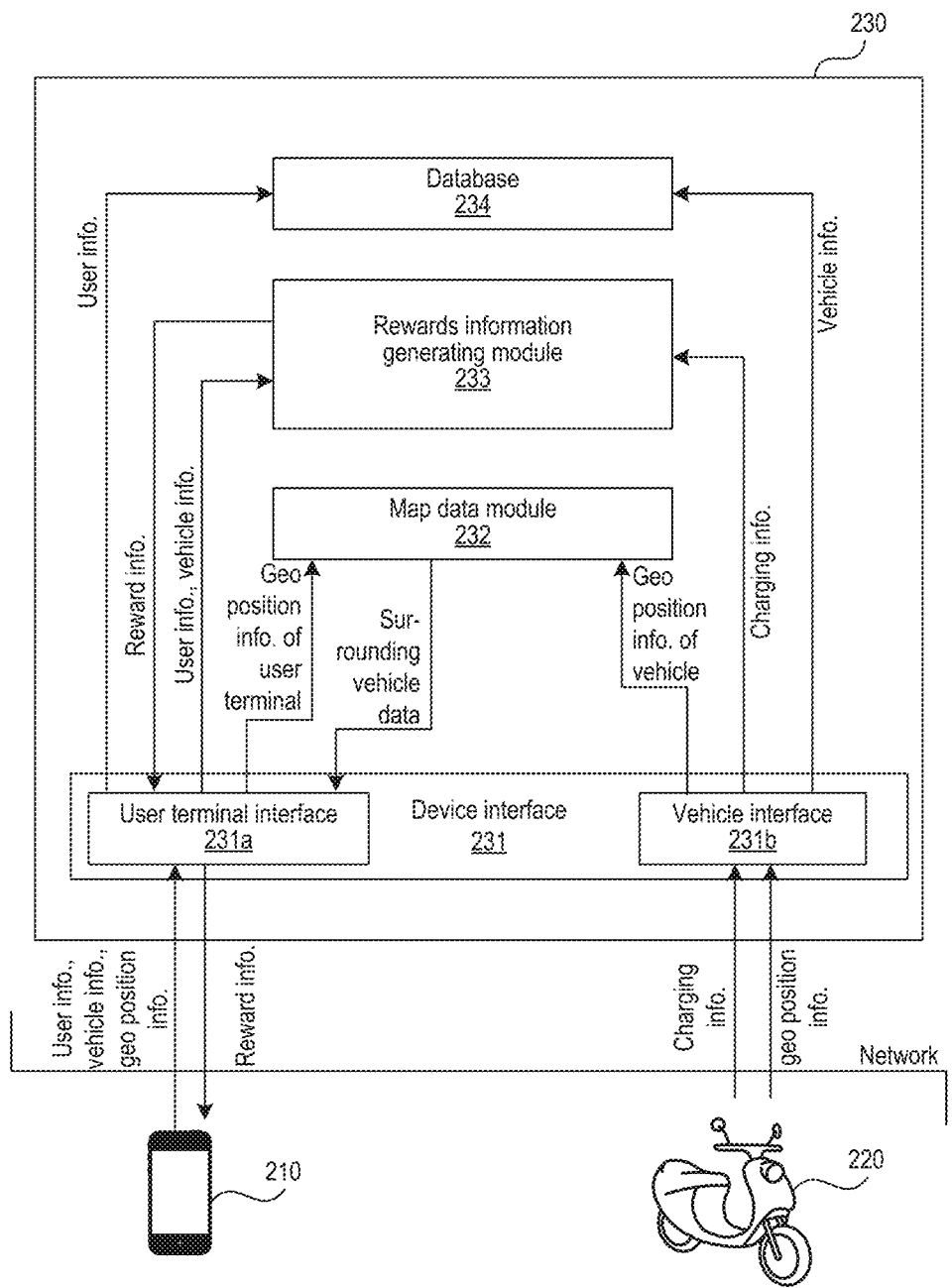
FIG. 11 illustrates a system of processing vehicle charging information performing a method of processing vehicle charging information in accordance with some embodiments of the disclosure.

FIG. 11 illustrates a flowchart for a system of processing vehicle charging information performing a method of processing a vehicle charging information in accordance with some embodiments of the disclosure. The system of processing vehicle charging information can comprise a user terminal 210, a vehicle 220, and a cloud server 230. The cloud server 230 can comprise a communication device interface 231, a map data module 232, a reward information generating module 233, and a database 234.

The vehicle 220 and the user terminal 210 can be operably connected to the cloud server 230 via a network and communicate with the cloud server 230 via the network. The communication interface 231 can comprise a user terminal interface 231a and a vehicle interface 231b. The user terminal interface 231a can be configured to receive information from the user terminal 210, e.g. the user information and information pertaining to the vehicle 220, and transmit information to the user terminal 210, e.g. the reward information. The vehicle interface 231b can be configured to receive information from the vehicle, e.g. geographical position information, and charging information.

The map data module 232 can be configured to receive the geographical position information of the user terminal from the user terminal 210 and the geographical position information of the vehicle 220, e.g. the geographical position information of the vehicle to be charged, and transmit to the user terminal 210, via the user interface 231a, the vehicle information of the vehicle to be charged around the user terminal 210 based on the geographical position of the user terminal 210 and the geographical position of the vehicle to be charged. The user terminal 210 can display on the client-end App the surrounding vehicles to be charged based on the received information, as shown in FIG. 2. Alternatively, the cloud server 230 may not comprise the map data module 232, and the functions of the map data module can be performed by other terminal devices.

The reward information generating module 233 can be configured to generate the reward information and transmit the reward information to the user terminal 210 through the user terminal interface 231a. The reward information can be generated based on the user information and vehicle information which are received from the user terminal 210, the charging information received from the vehicle, and the state information of the vehicle, e.g. power amount information, geographical position information, and vehicle returning time information, according to predetermined reward criterions, e.g. whether a power amount of the rechargeable battery of the vehicle is charged by the user to 95% or more, whether the vehicle is returned to the prescribed geographical position, and whether the vehicle is returned to the prescribed position within a prescribed time period. The database 234 can be configured to store and update at least one of the user information, the vehicle information, and respective geographical position information.

Figure 12:
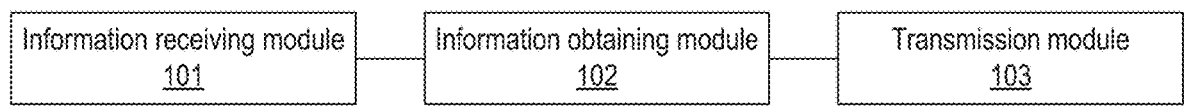
FIG. 12 is a schematic diagram of an apparatus for processing vehicle charging information at a cloud server in accordance with some embodiments of the disclosure.

FIG. 12 is a schematic diagram of an apparatus of processing a vehicle charging information at a cloud server in accordance with some embodiments of the disclosure. The apparatus of processing vehicle charging information can comprise an information receiving module 101, an information obtaining module 102, and a transmission module 103. The information receiving module 101 can be configured to receive the vehicle information from the user terminal. The information obtaining module 102 can be configured to obtain the charging information of the vehicle. The transmission module 103 can be configured to transmit to the user terminal, based on the state information of the vehicle, the reward information corresponding to the vehicle information. The state information can comprise at least the charging information.

Figure 13:
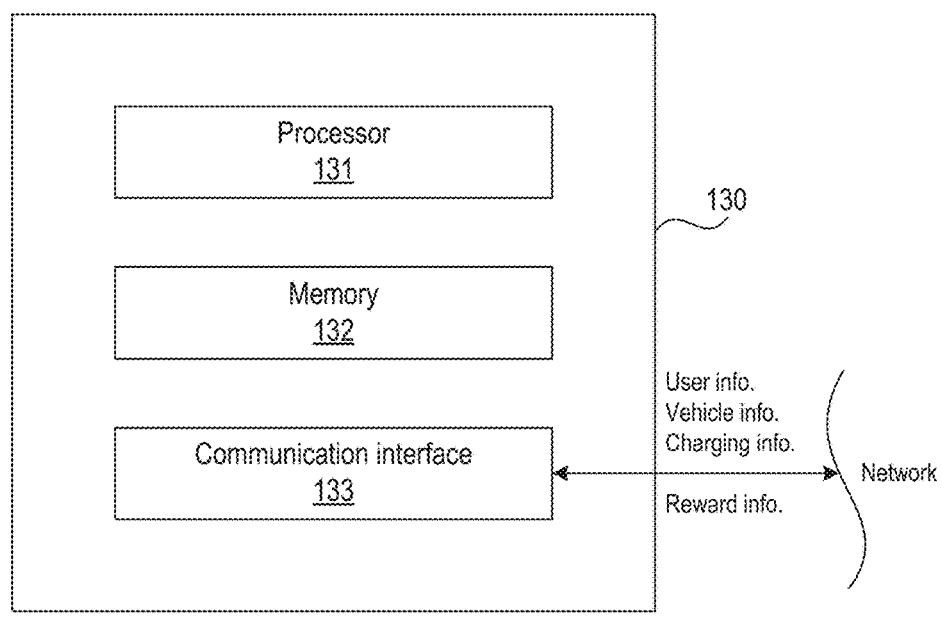
FIG. 13 is a schematic diagram of a cloud server in accordance with some embodiments of the disclosure.

FIG. 13 is a schematic diagram showing a configuration of a cloud server in accordance with some embodiments of the disclosure. The cloud server 130 can comprise at least one processor 131, a memory 132, and a communication interface 133. The communication interface 133 can be configured to receive the user information, the vehicle information, and the charging information of the vehicle, and transmit the reward information to the user terminal. The memory 132 can be configured to store at least one program which, when executed by the at least one processor 131, causes the at least one processor 131 to implement a method. The method can comprise receiving the user information and the vehicle information of the vehicle to be charged, receiving the charging information of the vehicle, and transmitting the reward information to the user terminal based on the state information of the vehicle. The state information can comprise the charging information.

Figure 14:
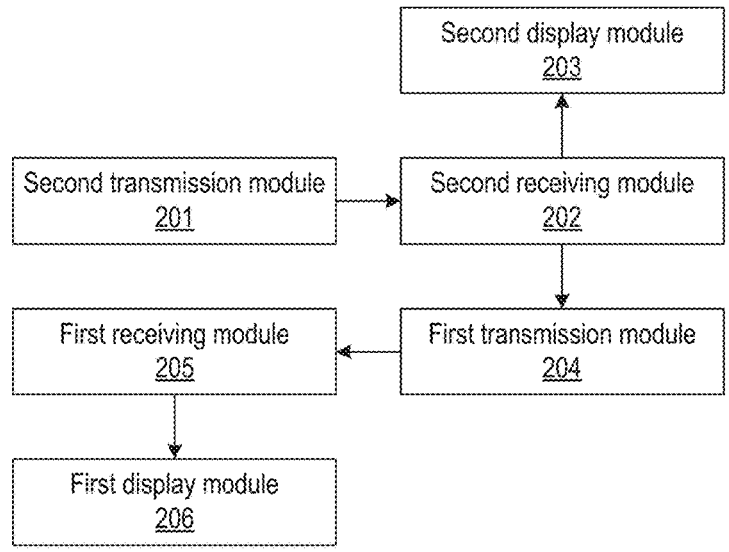
FIG. 14 is a schematic diagram of an apparatus for processing vehicle charging information at a user terminal in accordance with some embodiments of the disclosure.

FIG. 14 is a schematic diagram of an apparatus of processing vehicle charging information at a user terminal in accordance with some embodiments of the disclosure. The apparatus of processing a vehicle charging information can comprise a second transmission module 201, a second receiving module 202, a second display module 203, a first transmission module 204, a first receiving module 205, and a first display module 206.

The second transmission module 201 can be configured to transmit the first information to the cloud server. The first information can comprise the geographical position information of the user terminal.

The second receiving module 202 can be configured to receive the second information of the at least one candidate vehicle within the predetermined area with respect to the geographical position information of the user terminal, the geographical position information of the user terminal being received from the cloud server. The at least one candidate vehicle can be a vehicle having an internal battery satisfying the threshold state condition. The second information can comprise at least the current geographical position information of the at least one candidate vehicle.

The second display module 203 can be configured to display the initial reward information corresponding to the at least one candidate vehicle. The initial reward information can be cash or a gift that the user associated with the user terminal can receive if the user charges the candidate vehicle.

The first transmission module 204 can be configured to transmit the vehicle identity information to the cloud server. The first receiving module 205 can be configured to receive the reward information from the cloud server. The first display module 206 can be configured to display the reward information.

Figure 15:
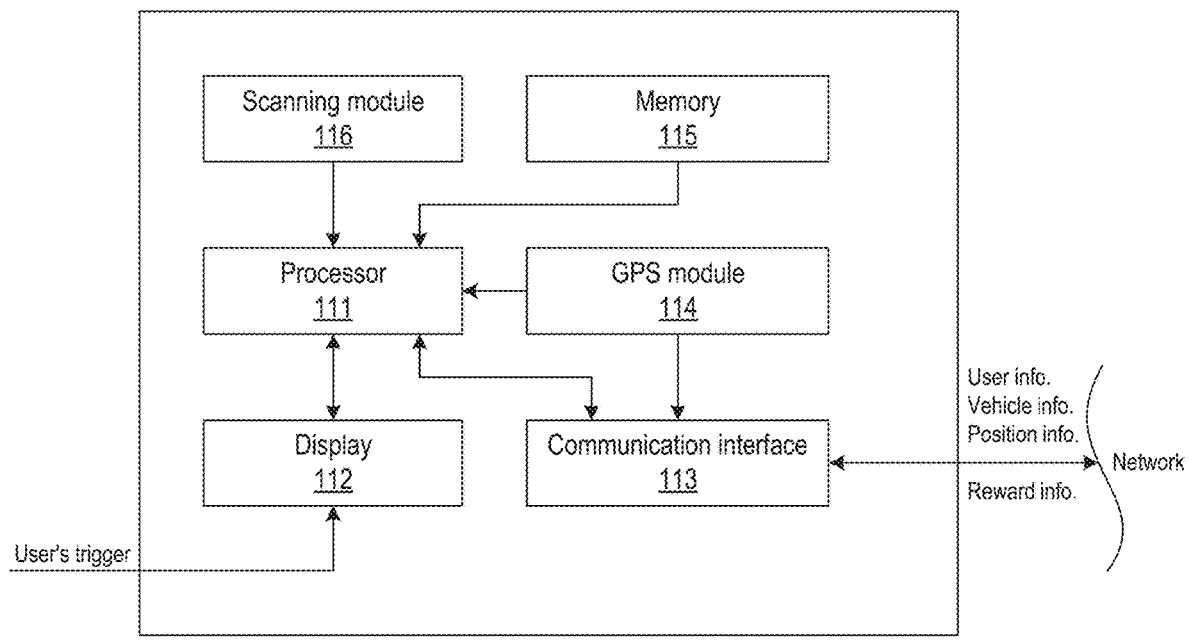
FIG. 15 is a schematic diagram of a user terminal in accordance with some embodiments of the disclosure.

FIG. 15 is a schematic diagram showing a configuration of a user terminal in accordance with some embodiments of the disclosure. The user terminal 110 can comprise a display 112, a communication interface 113, a processor 111, a GPS module 114, a memory 115, and a scanning module 116. The display 112 can be configured to display one or more surrounding vehicles that need to be charged when the user opens the client-end App on the client terminal and display the reward information. The processor 111 can be configured to execute at least one program stored in the memory 115. The GPS module can be configured to obtain the geographical position information of the user terminal and transmit the geographical position information to the communication interface 113 under the control of the processor 111. The scanning module 116 can be configured to request, to the cloud server, to scan and unlock the vehicle or lock the vehicle when the user opens the client-end App. The memory 115 can be configured to store at least one program, such as the client-end App.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention. It is intended that the following claims define the scope of the invention and that methods and structures within the scope of these claims and their equivalents be covered thereby.

The invention claimed is:

1. A method of processing charging information of a vehicle, comprising:
   receiving, at a cloud server, vehicle identity information from a user terminal;
   receiving, at the cloud server, location information corresponding to the vehicle;
   receiving, at the cloud server, location information corresponding to the user terminal;
   obtaining, at the cloud server, a user charged charge level of the vehicle;
   transmitting to the user terminal, by the cloud server, reward information corresponding to the vehicle identity information based on the user charged charge level of the vehicle; and
   determining whether a returning position information of the vehicle satisfies a second reward criterion when a charging information charge level of the vehicle satisfies a first reward criterion, wherein the first reward criterion is a battery power level that exceeds a predetermined power amount.

2. The method of claim 1, further comprising:
   prior to receiving vehicle identity information from a user terminal, receiving, at the cloud server, first information of the user terminal, wherein said first information comprises a geographical location information of the user terminal;
   obtaining, at the cloud server, second information of at least one candidate vehicle within a predetermined area with respect to said geographical location information of said user terminal based on said first information, wherein said at least one candidate vehicle comprises a vehicle having an inner battery satisfying a threshold state condition, and wherein said second information comprises a current geographic location information of the at least one candidate vehicle; and transmitting, by the cloud server, said second information of said at least one candidate vehicle to the user terminal, wherein the user terminal displays an initial reward information corresponding to said at least one candidate vehicle, wherein said initial reward information indicates a reward that a user associated with said user terminal receives if the user charges said candidate vehicle.

3. The method of claim 2, wherein receiving, at the cloud server, first information of the user terminal further comprises receiving request information from said at least one candidate vehicle within said predetermined area with respect to said geographical location information of said user terminal.

4. The method of claim 1, wherein a time when the cloud server receives the vehicle identity information of the user terminal comprises a time when the vehicle is unlocked, and wherein a time when the cloud server obtains the charge level of the vehicle comprises a time when a charging of the vehicle is completed.

5. The method of claim 1, wherein transmitting, by the cloud server, a reward information comprises:
determining whether the charge level of the vehicle satisfies a first reward criterion; and
transmitting the reward information to the user terminal when said first reward criterion is satisfied;
wherein said first reward criterion comprises a battery power level of the vehicle reaching or exceeding a predetermined power amount.

6. The method of claim 5, further comprising:
obtaining, at the cloud server, a returning position information of the vehicle, wherein transmitting, by the cloud server, a reward information further comprises:
determining whether the returning position information of the vehicle satisfies a second reward criterion when the charge level of the vehicle satisfies the first reward criterion; and
transmitting the reward information to the user terminal when said second reward criterion is satisfied;
wherein the second reward criterion comprises the returning position information of the vehicle being within a predetermined geographical range.

7. The method of claim 6, further comprising:
obtaining, at the cloud server, returning time information of the vehicle, wherein transmitting, by the cloud server, a reward information further comprises:
determining whether the returning time information of the vehicle satisfies a third reward criterion when the charge level of the vehicle satisfies the first reward criterion; and
transmitting the reward information to the user terminal when said third reward criterion is satisfied;
wherein said third reward criterion comprises the returning time information of the vehicle is within a predetermined time period.

8. The method of claim 1, wherein prior to transmitting, by the cloud server, a reward information, the method further comprises:
the cloud server calculating a reward for current charging based on the charge level of the vehicle and a predetermined reward criterion; and
generating the reward information corresponding to the vehicle information;
wherein the reward information indicates the reward; and
wherein the predetermined reward criterion comprises a predetermined correspondence between the charge level of the vehicle and the reward.

9. The method of claim 1, further comprising:
obtaining, at the cloud server, a returning position information of the vehicle and a returning time information of the vehicle, wherein prior to transmitting, by the cloud server, a reward information, the method further comprises:
the cloud server calculating a reward for current charging based on the charge level of the vehicle, the returning position information of the vehicle, and the returning time information of the vehicle according to a predetermined reward criterion; and
generating the reward information corresponding to the vehicle information;
wherein the reward information indicates the reward; and
wherein the predetermined reward criterion comprises a predetermined weighted correspondence between the charge level of the vehicle, the returning position information of the vehicle, and the returning time information of the vehicle and the reward.

10. A method of processing charging information of a vehicle, comprising:
transmitting identity information of the vehicle to a cloud server;
receiving reward information from the cloud server based on a user charged charge level of the vehicle; and
displaying the reward information;
prior to transmitting the identity information of the vehicle to the cloud server:
transmitting a first information to the cloud server, wherein said first information comprises a geographical location information of a user terminal;
receiving, from said cloud server, second information of at least one candidate vehicle within a predetermined area with respect to said geographical location information of said user terminal,
wherein said at least one candidate vehicle is a vehicle having an inner battery satisfying a threshold state condition, and
wherein said second information comprises a current geographic location information of the at least one candidate vehicle;
displaying initial reward information corresponding to the at least one candidate vehicle,
wherein said initial reward information indicates a reward that a user associated with said user terminal receives if the user charges said candidate vehicle; and
obtaining the identity information of a vehicle selected by the user for charging from among the at least one candidate vehicle.

11. A system for processing charging information of a vehicle, comprising:
at least one user terminal;
at least one vehicle; and
at least one cloud server;
wherein the at least one user terminal is configured to transmit vehicle information to said at least one cloud server;
wherein said at least one cloud server is configured to receive the vehicle information from the at least one user terminal, obtain a user charged charge level of the at least one vehicle, and transmit to the user terminal reward information corresponding to the vehicle information based on the obtained charge level of the at least one vehicle;

wherein the at least one vehicle is configured either to transmit the charge level to the at least one cloud server or provide the charge level of the vehicle in response to a request from the at least one cloud server; and wherein the at least one cloud server is further configured to:

obtain second information of at least one candidate vehicle within a predetermined area with respect to said geographical location information of said user terminal based on said first information, wherein said at least one candidate vehicle is a vehicle having an inner battery satisfying a threshold state condition, and wherein said second information comprises a current geographic location information of the at least one candidate vehicle; and transmit said second information of said at least one candidate vehicle to the user terminal, wherein the user terminal displays an initial reward information corresponding to said at least one candidate vehicle, and wherein said initial reward information indicates a reward that a user associated with said user terminal receives when the user charges said candidate vehicle.

12. The system of claim 11, wherein the at least one cloud server is further configured to transmit the reward information corresponding to the vehicle information to the at least one user terminal by determining whether the charge level of the at least one vehicle satisfies a first reward criterion, and transmitting the reward information to the at least one user terminal if said first reward criterion is satisfied, and wherein said first reward criterion is a battery power level of the at least one vehicle reaching or exceeding a predetermined power amount.

13. The system of claim 11, wherein the at least one cloud server is further configured to obtain returning position information of the at least one vehicle, wherein the at least one cloud server is configured to transmit the reward information corresponding to the vehicle information to the at least one user terminal by determining whether the returning position information of the at least one vehicle satisfies a second reward criterion when the charge level of the at least one vehicle satisfies the first reward criterion, and transmitting the reward information to the at least one user terminal when said second reward criterion is satisfied, and wherein the second reward criterion comprises the returning position information of the at least one vehicle being within a predetermined geographical range.

14. A computer-implemented rewards-based method, comprising:

obtaining current status of one or more vehicles distributed in a region, wherein the current status comprises a level of one or more power sources that are used to propel said vehicles and geographical location of the one or more vehicles within the region;

determining an initial reward for a user replenishing the one or more power sources based on the current status; and transmitting data indicative of the initial reward to one or more user terminals;

wherein the initial reward is provided to incentivize users that are associated with the one or more user terminals to retrieve the one or more vehicles or to replenish the one or more power sources;

wherein the initial reward only is displayed on the one or more user terminals:

when said user terminals are in proximity to the one or more vehicles;

when users navigate via an electronic map on the user terminals to the geographical location of the one or more vehicles; or when the level of the one or more power sources decreases below a predetermined threshold; and wherein an amount of the initial reward is correlated with any of:

the level of the one or more power sources, the geographical location of the one or more vehicles, human traffic in proximity to the geographical location of the one or more vehicles, commuter demand or needs for the one or more vehicles at the associated geographical location, frequency of usage of the one or more vehicles at the geographical location, a number of user terminals in proximity to the geographical location of the one or more vehicles, or a level of ease or difficulty of access to the one or more vehicles at their geographical location.

15. The method of claim 14, further comprising:

receiving requests from users associated with the one or more user terminals to replenish the power sources of the one or more vehicles;

determining whether to grant the requests; and sending notifications to the users whose requests have been granted through the one or more user terminals;

wherein the notifications comprise any of:

instructions to the users whose requests have been granted to retrieve the corresponding vehicles and replenish the power sources of said corresponding vehicles; and instructions to the users whose requests have been granted to unlock the corresponding vehicles.

* * * * *